No. 780,318. PATENTED JAN. 17, 1905.
R. E. BOSCHERT.
POWER PRESS.
APPLICATION FILED JULY 13, 1904.

9 SHEETS—SHEET 1.

WITNESSES:
D. H. Fulmer.
J. J. Laass

INVENTOR
Rufus E. Boschert
By E. Laass
ATTORNEY.

No. 780,318. PATENTED JAN. 17, 1905.
R. E. BOSCHERT.
POWER PRESS.
APPLICATION FILED JULY 13, 1904.

9 SHEETS—SHEET 3.

WITNESSES:
L. H. Fulmer.
J. J. Laass

INVENTOR:
Rufus E. Boschert
By E. Laass
ATTORNEY.

No. 780,318. PATENTED JAN. 17, 1905.
R. E. BOSCHERT.
POWER PRESS.
APPLICATION FILED JULY 13, 1904.

9 SHEETS—SHEET 5.

WITNESSES:
G. H. Fulmer
J. J. Laas

INVENTOR
Rufus E. Boschert
By E. Laas
ATTORNEY.

No. 780,318. PATENTED JAN. 17, 1905.
R. E. BOSCHERT.
POWER PRESS.
APPLICATION FILED JULY 13, 1904.

9 SHEETS—SHEET 6.

WITNESSES:
C. H. Fulmer.
J. J. Laass

INVENTOR
Rufus E. Boschert
By E. Laass
ATTORNEY.

No. 780,318. PATENTED JAN. 17, 1905.
R. E. BOSCHERT.
POWER PRESS.
APPLICATION FILED JULY 13, 1904.
9 SHEETS—SHEET 7.
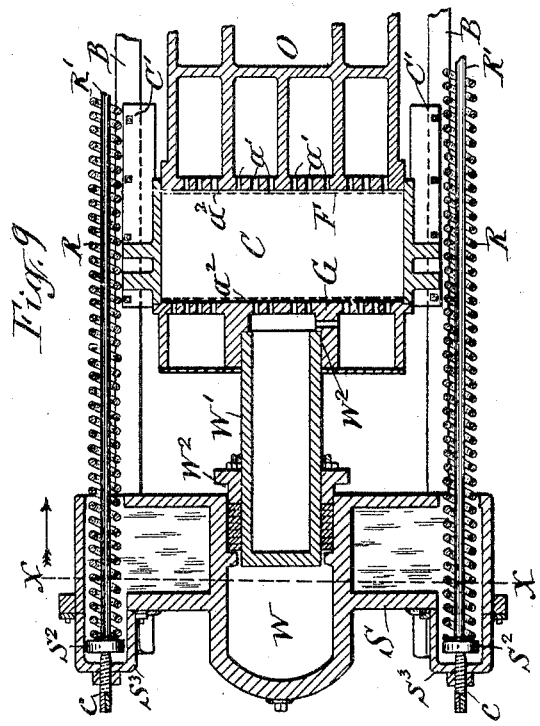
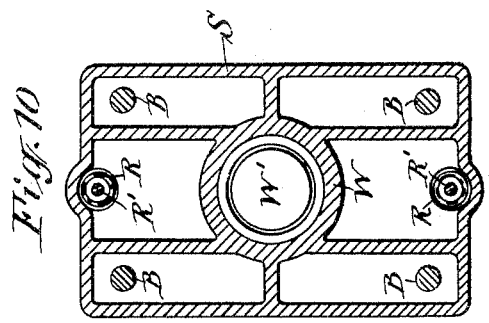
WITNESSES:
L. H. Fulmer.
J. J. Laass
INVENTOR
Rufus E. Boschert
By E. Laass
ATTORNEY.

No. 780,318. PATENTED JAN. 17, 1905.
R. E. BOSCHERT.
POWER PRESS.
APPLICATION FILED JULY 13, 1904.

9 SHEETS—SHEET 8.

WITNESSES:
L. H. Fulmer.
J. J. Laass

INVENTOR
Rufus E. Boschert
By E. Laass
ATTORNEY.

No. 780,318. PATENTED JAN. 17, 1905.
R. E. BOSCHERT.
POWER PRESS.
APPLICATION FILED JULY 13, 1904.
9 SHEETS—SHEET 9.
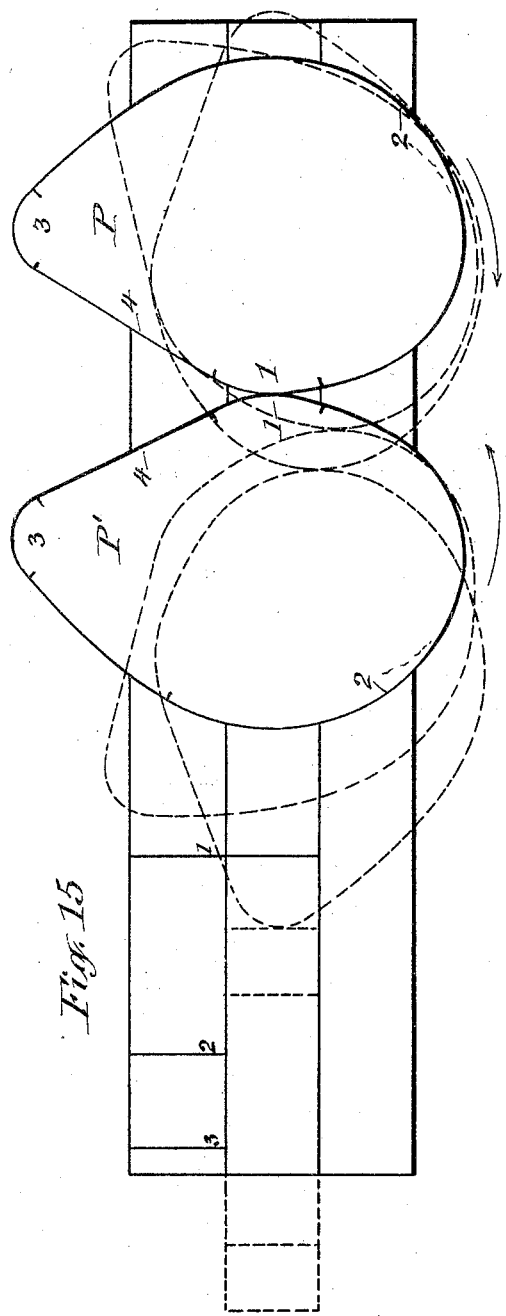
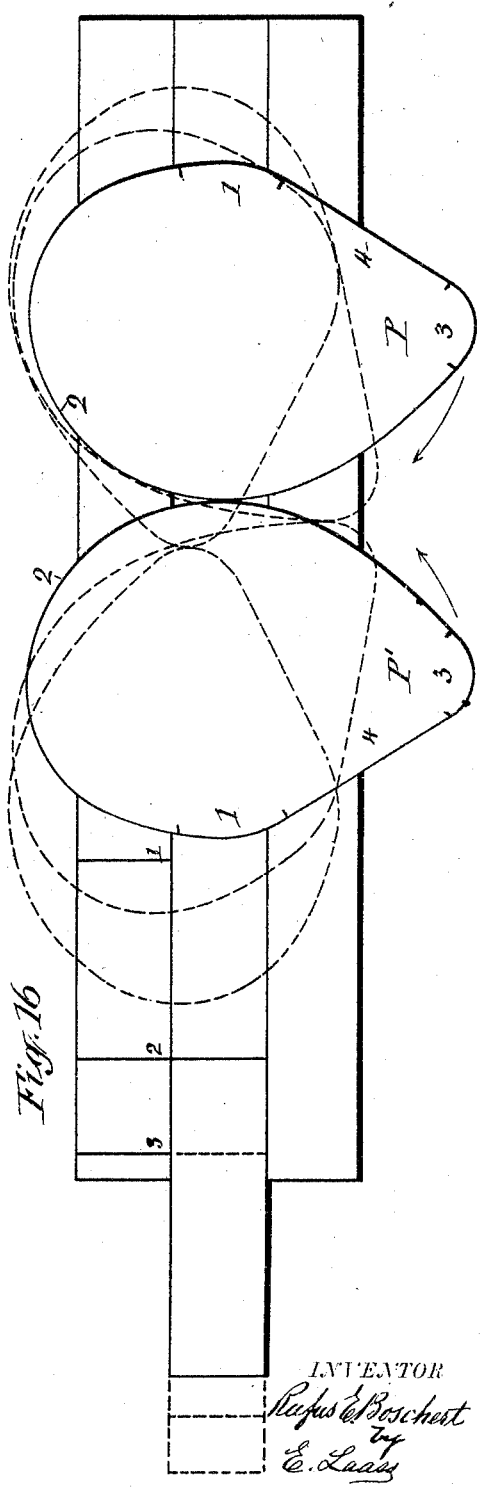
Fig. 15
Fig. 16
WITNESSES:
L. H. Fulmer.
J. J. Laass
INVENTOR
Rufus E. Boschert
by
E. Laass
ATTORNEY.

No. 780,318. Patented January 17, 1905.

UNITED STATES PATENT OFFICE.

RUFUS ELDRED BOSCHERT, OF SYRACUSE, NEW YORK.

POWER-PRESS.

SPECIFICATION forming part of Letters Patent No. 780,318, dated January 17, 1905.

Application filed July 13, 1904. Serial No. 216,437.

*To all whom it may concern:*

Be it known that I, RUFUS ELDRED BOSCHERT, of Syracuse, in the county of Onondaga, in the State of New York, have invented new and useful Improvements in Power-Presses, of which the following, taken in connection with the accompanying drawings, is a full, clear, and exact description.

This invention relates to the type of power-press shown in my Letters Patent No. 753,038, issued February 23, 1904.

My present invention consists in improved mechanisms for operating the press and accomplishing the same results by improved means, as hereinafter described, and illustrated in the annexed drawings, in which—

Figure 1:
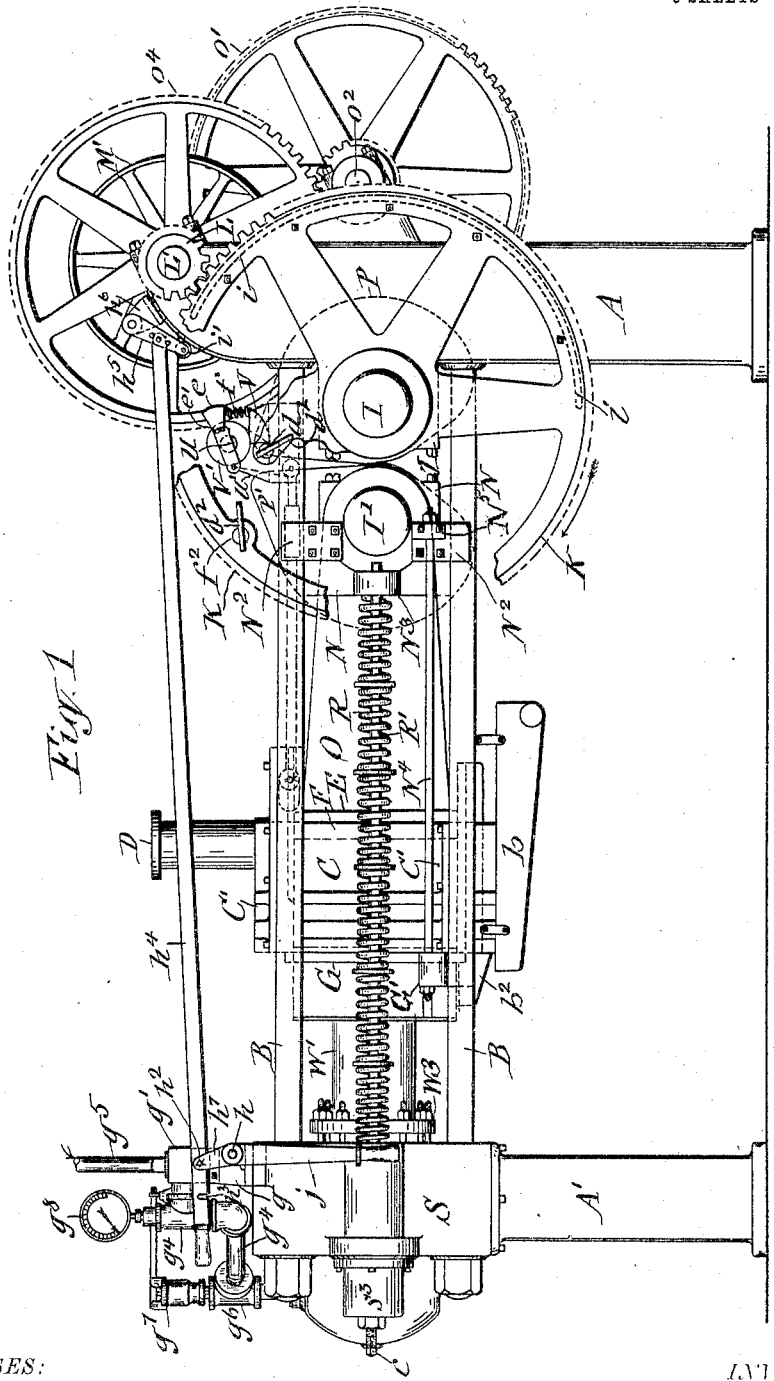
Figure 2:
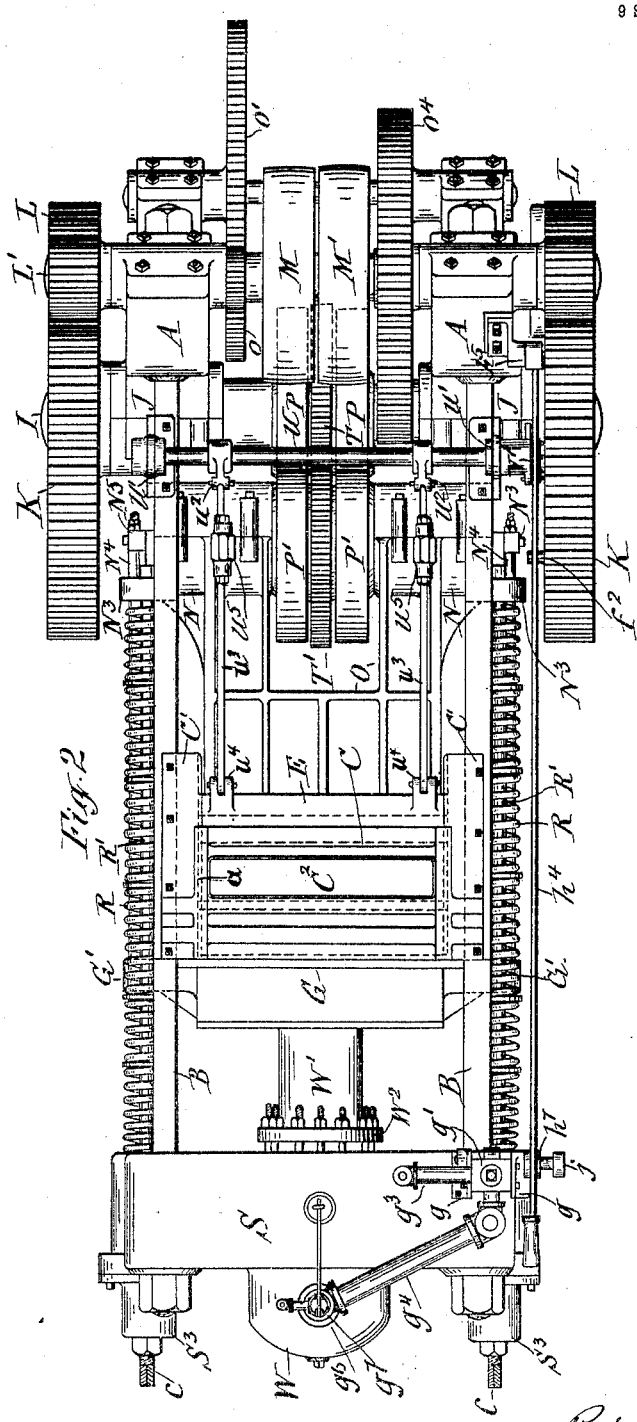
Figure 3:
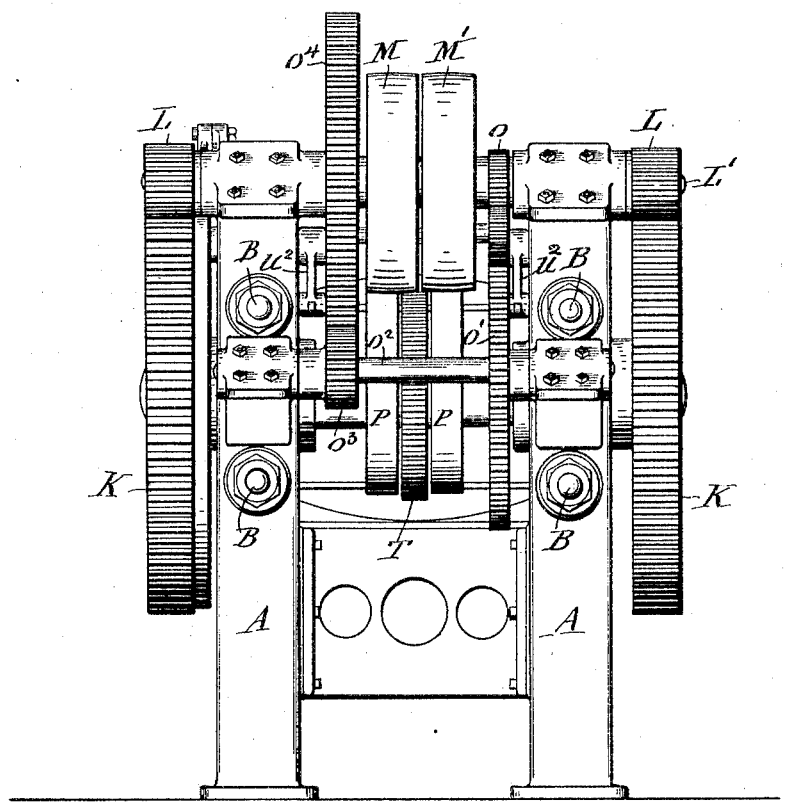
Figure 4:
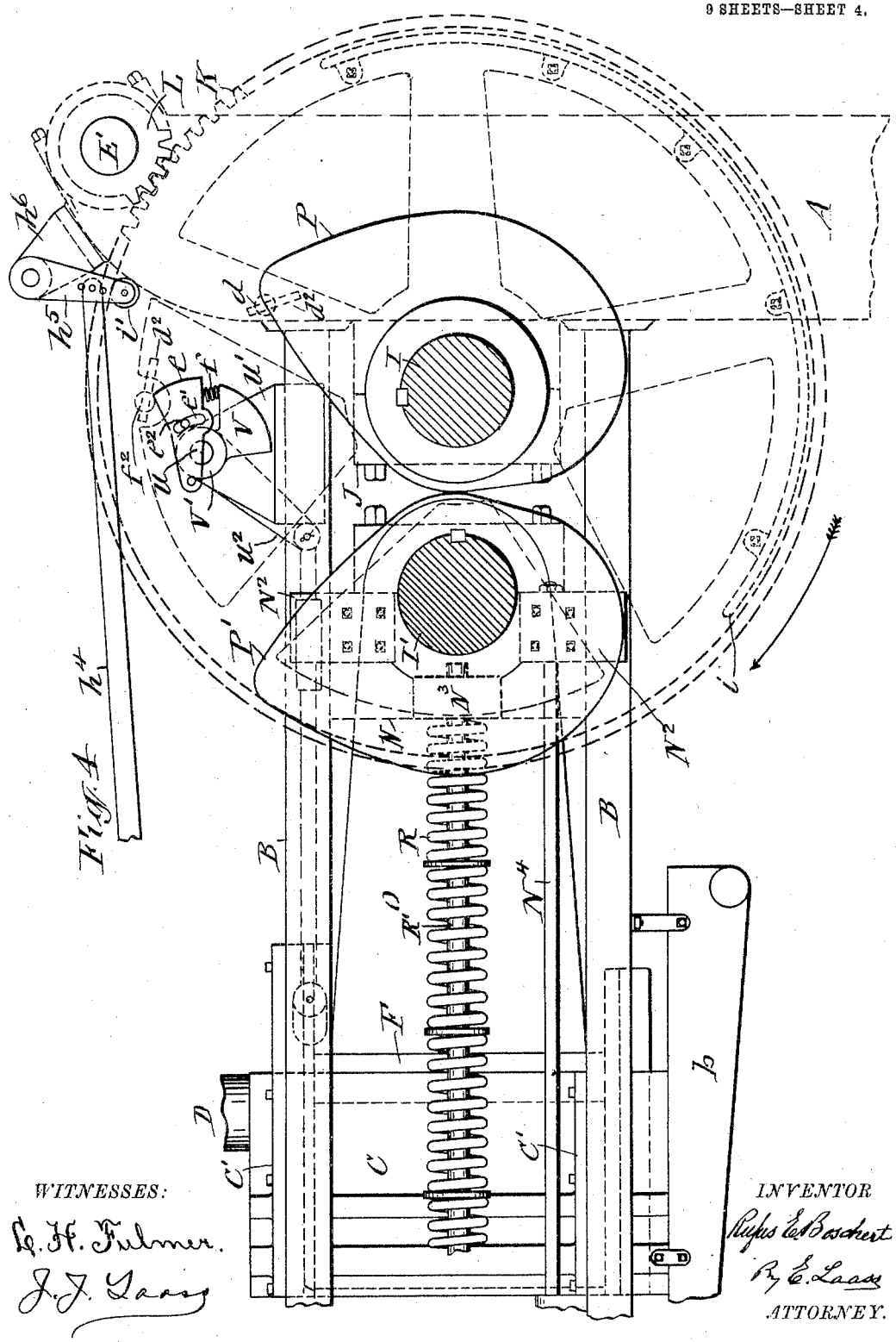
Figure 5:
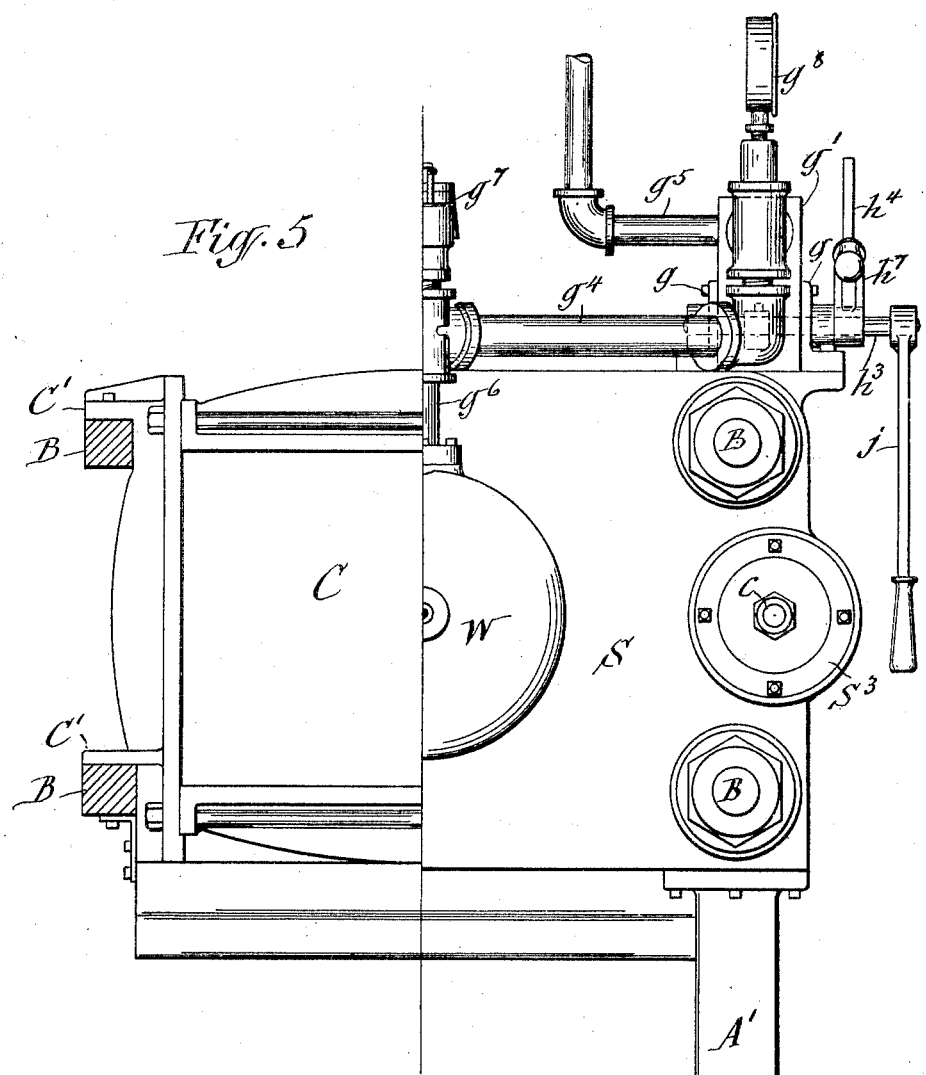
Figure 17:
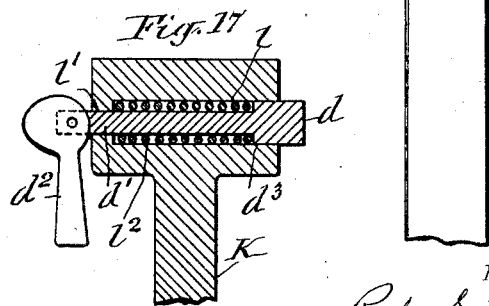
Figure 6:
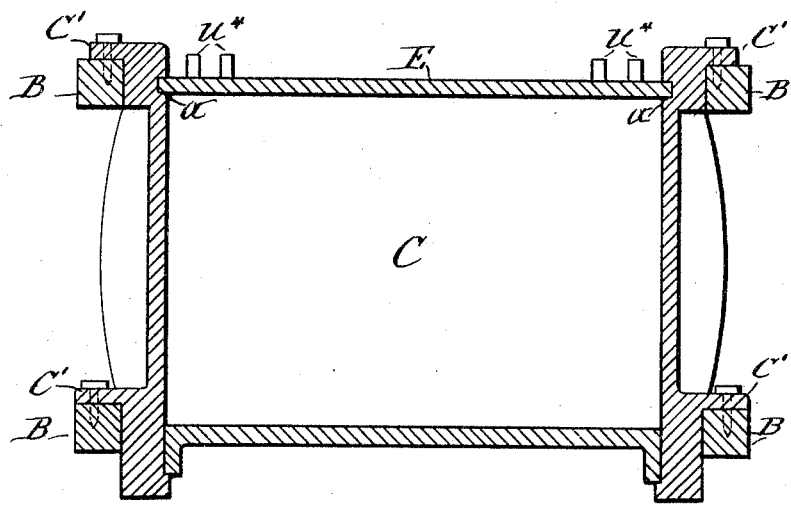
Figures 7, 8:
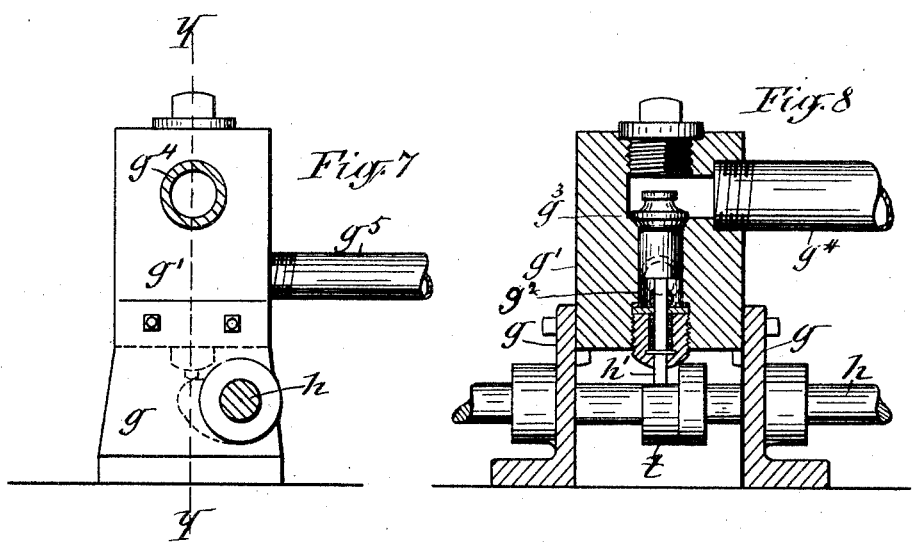
Figure 13:
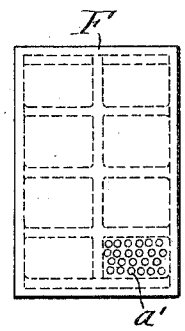
Figure 11:
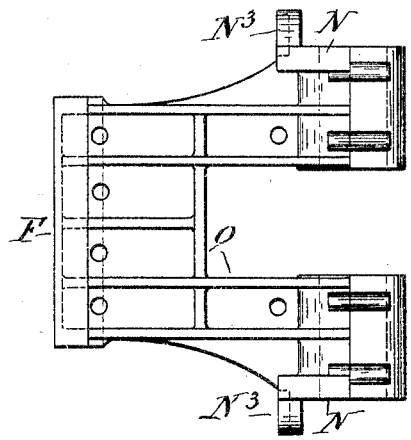
Figure 14:
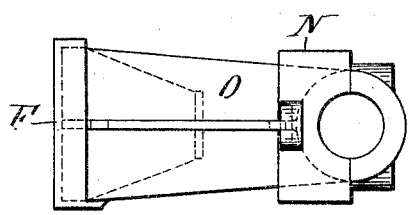
Figure 12:
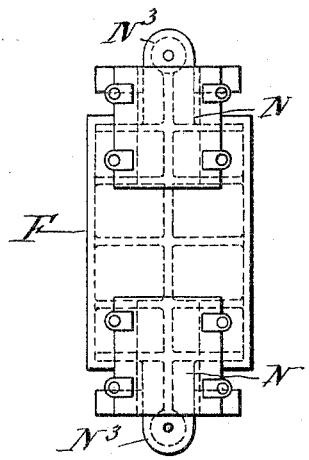

Figure 1 is a side elevation of a press embodying my improvements. Fig. 2 is a plan view of the same. Fig. 3 is a front elevation. Fig. 4 is an enlarged side view of the mechanism which moves the gate to and from the feed-port of the press-chamber. Fig. 5 shows partly end views of the press and press-chamber. Fig. 6 is a vertical transverse section of the press-chamber. Fig. 7 is an enlarged side elevation of the water-controlling valve. Fig. 8 is a vertical transverse section on line Y Y in Fig. 7. Fig. 9 is a horizontal section of the press-chamber. Fig. 10 is a transverse section on line X X in Fig. 9. Figs. 11, 12, 13, and 14 are respectively plan, front, and rear end and side views of the pressing-plunger. Figs. 15 and 16 are plan views of the cams in different operative positions. Fig. 17 is an enlarged sectional view of the adjustable connections of the tripping-pins to the wheel.

A and A' are standards which are disposed under the ends of the press and in conjunction with longitudinal rods B B constitute the supporting-frame of the press.

C denotes the press-chamber for the reception of the material to be compressed. Said press-chamber extends across the aforesaid supporting-frame and is rigidly secured to the tie-rods B B, preferably by means of flanges C' C', projecting from the press-chamber and bolted to the tie-rods.

The press-chamber C is formed open through its front and rear and is provided with a feed-port $C^2$ in its top.

A suitable conduit D conveys to the press-chamber the material to be compressed.

A gate E slides in ways $a$ on the press-chamber and is moved to and from its closed position in the feed-port $C^2$ by mechanisms hereinafter described.

F represents the plunger, which is fitted closely to the interior of the press-chamber to compress the material introduced therein. Said plunger is perforated, as partly shown at $a$ in Fig. 13 of the drawings, and is provided on its inner face with a lining $a^2$ of perforated sheet metal or other suitable material permitting the escape of the liquid expressed from the material in the press-chamber.

G represents the head, which is movable to and from the back end of the press-chamber and closes said end during the operation of compressing the material in the press-chamber.

All of the aforesaid parts of the press are arranged similar to the corresponding parts shown in my Letters Patent No. 753,038, hereinbefore referred to.

My present invention resides chiefly in the means for operating the press; and it consists in the construction and combination of parts, as herein presently described.

Inasmuch as my invention is more particularly designed for treating liquid or semiliquid wood-pulp, I will, for brevity of the following description, refer to such pulp as being the material operated on by the press.

In suitable bearings J, secured to the front standards A A, is mounted a transverse shaft I, which is thus maintained at a uniform distance from the press-chamber C. Said shaft is hereinafter referred to as the "main cam-shaft." Between this shaft and the front end of the press-chamber C is disposed a companion cam-shaft I', which is mounted at its ends in journal-boxes N N, which are formed integral with the plunger-yoke, hereinafter described, and fitted to slide longitudinally on the tie-rods B B. To the sides of the journal-boxes N N are bolted or otherwise rigidly attached plates or straps $N^2$, which engage the sides of the tie-rods and serve to guide the aforesaid journal-boxes in their movement, which is imparted to them by mechanism hereinafter described. On the main shaft I are rigidly mounted cams P P, which are shaped substantially alike and of a peculiar contour, which will be hereinafter described.
A correspondingly-shaped pair of cams P' P' is rigidly mounted on the companion shaft I'. These cams are placed reverse from the cams P P, with which they are held in contact, as hereinafter explained. To prevent the contacting faces of the cams from slipping, I mount on each of the shafts I I' an irregular gear, indicated at T T' and preferably placed between the cams. The pitch-line of said gears corresponds to the contours of the cams to allow the gears to continuously intermesh during the rotation of the cams.

O represents a yoke or frame which is preferably formed integral with the plunger F and is provided at its opposite end with the journal-boxes N N, through which passes the shaft I'. This shaft is forced toward the press-chamber C by the rotation of the cams P P', and thus the yoke O, with the plunger F, is pushed toward the back head G, which latter closes the rear end of the press-chamber during the period of the aforesaid movement of the plunger.

To retract the plunger after it has been relieved from the propelling force, I employ at each side of the press a spiral spring R, which bears at one end on the back of an ear $N^3$, formed on the journal-boxes N N. The opposite end of said spring abuts against the face of a plate $S^2$, which is sustained upon the front end of a set-screw $c$, passing through the cap $S^3$, formed on or bolted to the breast S, which is supported upon the top of the rear standard A'. By means of said set-screw the pressure of the spring can be regulated. (See Fig. 9.) A rod R' passes longitudinally through the spring to keep said spring in line. Said rod R' is connected at one end to the plate $S^2$ and has its opposite end passing freely through an eye in the ear $N^3$, as shown in Figs. 1 and 2.
The cams P P' are shaped to allow the back head G to be drawn to the rear end of the press by the rods $N^4$ and to retain the plunger in its retracted position for a sufficient period during which the press-chamber is charged with liquid pulp and the gate E moved to close the feed-port $C^2$. The press-chamber is thus prepared for receiving the succeeding inward pressure of the plunger, which expresses the liquid from the introduced pulp.
Said liquid escapes through the perforations of the back head G and plunger F and passes to a receptacle $b$, which is hung on the lower rods B and extends across the press below the press-chamber C. A gutter $b^2$ is attached to the bottom of the back head G and leads to the box $b$.

The gate E slides in grooves $a$ in the sides of the press-chamber, so as to dispose the bottom of the gate in the same plane with the under side of the top of the press-chamber.

This gate is opened and closed automatically at the proper times by the following mechanisms: Above the shaft I is a rock-shaft U, extending across the press and mounted at its ends in bearings or boxes U' U', which are rigidly secured to the upper tie-rods B. To the rock-shaft are fastened two arms $U^2 U^2$, which by means of rods $U^3 U^3$ are connected with ears $U^4 U^4$, projecting from the front of the gate. Each of these rods is preferably composed of two end sections, which are provided on their adjacent end portions with right and left screw-threads and connected together by means of a nut $U^5$, which allows their connection to be adjusted to either increase or reduce the length of the rod, as may be found necessary to carry the gate to its proper closing position. The rock-shaft is turned in one direction by means of a lug V, projecting from a collar V', which is fastened to the rock-shaft. On the end of the shaft I is rigidly mounted a gear-wheel K, which receives rotary motion by mechanisms hereinafter described. The direction of rotation is indicated by the dart shown in Fig. 1. The wheel K is provided with a laterally-projecting pin $d$, which is disposed to swing the lug V forward, and thereby turn the rock-shaft a sufficient distance to cause the arms $U^2 U^2$ thereof to draw the gate E to its open position. The rock-shaft is turned in the opposite direction to push the gate to its closed position by means of a lever $e$, which is pivoted at one end to the collar V', and bears at its opposite end on the top of a spiral spring $f$, mounted on a forward extension of the lug V. A pin $f^2$ projects from the side of the wheel $k$ and is disposed to press down the spring-supported free end of the lever $e$ during the revolution of the wheel $k$. (See Figs. 1 and 4 of the drawings.) The spring has sufficient tension to cause it to swing the lug V rearward, and thus turn the rock-shaft to cause the arms $U^2$ $U^2$ to push the gate into its closed position on the press-chamber. The free end portion of the lever $e$ is provided with a segmental slot $e'$, through which passes a pin $e^2$, affixed to the collar V' to limit the rebound of the lever. The purpose of the spring $f$ is to guard against injury to the gate or its actuating mechanism in case the gate encounters some obstructions in moving to its closed position.

In order to allow the gate to remain closed when it is desired to apply a second pressure to the pulp, I mount the tripping-pins $d$ and $f^2$ movably endwise in the wheel K, as shown in Fig. 17, in which $l$ represents a socket formed in the wheel and terminated in a central aperture $l'$ at one end. $d$ denotes the tripping-pin which slides endwise in the socket $l$ and is formed with a circumferentially-reduced shank $d'$, which passes through the aperture $l'$ and has pivoted to its protruding end a cam-lever $d^2$. In the socket $l$ is a spiral spring $l^2$, surrounding the shank $d$ and pressing on a shoulder $d^3$, formed on the back of the pin $d$, which is thus held normally in its projecting position. By swinging the cam-lever on its pivot so as to cause the large portion of the cam to bear on the side of the wheel K the pin is withdrawn from its projecting position, and thus the gate E is allowed to remain closed or open as long as desired without stopping the machine.

The back head G is automatically moved to the rear end of the press-chamber at properly-timed intervals to close the said end during a sufficient period to allow the press-chamber to be charged with the liquid pulp and the liquid to be expressed therefrom by the plunger F, which latter then pushes the back head G from the press-chamber to allow the compressed pulp to be discharged through the said end of the press-chamber. These effects are produced by the following means: Through the breast S on the rear standards A' extends the hydrostatic cylinder W, which is closed at its rear end and open at its front end. In the said cylinder is a piston W', which extends through the open front end of the cylinder and is inserted into a tightly-fitting socket $W^2$, formed on the back of the head G, as shown in Figs. 9 and 10 of the drawings. A stuffing-box $W^3$ on the front end of the cylinder renders the said end water-tight. Upon the top of the breast S are rigidly mounted brackets $g$ $g$, which support between them a valve-cage $g'$, formed with a vertical water-passage $g^2$, which is provided at its upper end with a valve $g^3$. From the said end of the passage $g^2$ extends horizontally a conductor $g^4$, the communication of which with the passage $g^2$ is controlled by the valve $g^3$. Another conductor or pipe $g^5$ communicates at one end with the passage $g^2$ below the valve $g^3$ and is extended to an overhead tank (not shown) which contains water. The conductor $g^4$ is extended to and communicates with a pipe $g^6$, which leads to the rear portion of the interior of the cylinder W. A safety-valve $g^7$ of any suitable and well-known form is applied to the upper end of the pipe $g^6$. A pressure-gage $g^8$ is connected to the conductor $g^4$. In the brackets $g$ $g$ is pivoted a shaft $h$, which has projecting from it a lug $t$, upon which rides the valve-stem $h'$, which is thereby caused to lift the valve by the rocking of the shaft $h$. This movement of the shaft $h$ is effected by means of an upwardly-extending arm $h^7$, fastened to said shaft and provided on its upper end with a laterally-projecting pin $h^2$, which engages one of the notches $h^3$ in a rod $h^4$, which extends to the front end portion of the press and is connected thereat to an arm $h^5$, pivoted to a bracket $h^6$, mounted on one of the front standards A. Said arm is provided with a plurality of holes at different distances from the pivot of the arm for connecting the rod $h^4$ thereto, and thus adjust the thrust of said rod. The arm $h^5$ is actuated by means of a rib $i$, projecting from the side of the wheel K and concentric therewith. Said rib extends not quite half-way around the wheel and is disposed to engage by its forward end a roller $i'$, pivoted to the lower end of the arm $h^5$. Said engagement is caused during part of the revolution of the wheel K and swings the free end of the arm $h^5$ forward a sufficient distance to cause the rod $h^4$ to turn the shaft $h$ by means of the arm $h^7$. This action of said shaft causes the lug $t$ to push up the stem $h'$, which lifts the valve $g^3$ from its seat, and thus allows water to pass from the tank into the conductor $g^4$, from which the water passes through the pipe $g^6$ into the cylinder W. When this cylinder is filled, the arm $h^5$ is released from the rib $i$ and allows the arm $h^7$ to be thrown forward and the valve $g^3$ to drop to its closed position, thus retaining the water in the cylinder W and holding the back head G in position until again released. To insure the movement of the arm $h^7$, I attach to the shaft $h$ a depending lever $j$, which normally turns the shaft $h$ to a position which allows the valve $g^3$ to drop by gravity. By placing the pin $h^2$ of the arm $h^7$ into the second notch $h^3$ of the rod $h^4$ the arm $h^5$ is held out of the path of the rib $i$, and then the valve is controlled by the hand-lever $j$.

In order to obtain the necessary power for operating the press, I prefer to mount both pulleys M and M' loose on the shaft I' and rigidly attach to or form integral with the pulley M a pinion $o$, which meshes in a gear $o'$, fastened to a transverse shaft $o^2$. On this shaft is rigidly mounted a pinion $o^3$, which meshes in a gear $o^4$, fastened to the shaft L', to the ends of which are rigidly connected the pinions L L, which mesh in the gear-wheels K K, attached to the ends of the main cam-shaft I.

The cams P P' are shaped to vary the movement of the plunger F, so as to afford sufficient time to charge the press-chamber with pulp, then impart a rapid advancing movement to the plunger while the pulp is in its liquid condition, and gradually reduce said movement and increase the pressure as the pulp increases in density or compactness, then thrust the compressed pulp out through the rear end of the press-chamber, and then quickly retract the plunger to the place of the beginning of the stroke and temporarily retain it there to allow the press-chamber to be refilled and prepared for the succeeding stroke. The contours of the cams which produce the aforesaid effects are more clearly shown in Figs. 15 and 16 of the drawings. The essential features of said contours are the concentric curves 1, which leave the plunger dormant in its retracted position during about one-twelfth of the revolution of the cam-shafts. The succeeding prolongated curved portions 2 effect the compression of the pulp during about seven-twelfths of the revolutions of the cam-shafts. The next sharply-curved portion 3 causes the plunger F to receive a thrust forward, which forces the compressed pulp through the rear end of the press-chamber, which is effected during about two-twelfths of the revolution of the cam-shafts. The succeeding prolongated and comparatively flat faces 4 of the cams allow the piston to be completely retracted during about two-twelfths of the revolution of the cam-shafts.

To insure a perfect closing of the rear end of the press-chamber, I prefer to employ at opposite sides of the press two rods $N^4$, which pass at their ends freely through holes in ears $N^5$ and $G'$, attached, respectively, to the journal-boxes N N and to the back head G. The protruding ends of said rods are screw-threaded and supplied with nuts, as shown in Fig. 1 of the drawings, which nuts can be adjusted to cause the rods $N^4$ to draw the back head G tightly onto the rear end of the press-chamber when the plunger is in its retracted position.

The operation of the described press is as follows: When the plunger F has exerted the maximum pressure on the pulp and the compressed cake is ready to be pushed out of the press-chamber C, the rib $i$ on the wheel $k$ engages the arm $h^5$, which opens the valve $g^3$ and allows the water to be forced out of the cylinder W into the tank above. (Not shown.) The retraction of the plunger F draws, by means of the rods $N^4$, the back head G to its closed position on the rear end of the press-chamber, at which time the arm $h^5$ drops from the ribs $i$, and thus closes the valve $g^3$ and prevents the water from leaving the cylinder W until by subsequent action of the valve mechanism the valve is again opened. Immediately thereafter the pin $d$ strikes the lug $v$, and thereby turns the rock-shaft U to cause the rods $U^3$ to draw the gate E to its open position, and thus allow the liquid pulp to enter into the press-chamber C, which is quickly filled and the gate E is pushed to its closed position by the engagement of the pin $f^2$ with the lever $e$, which turns the rock-shaft U so as to cause it to push the gate E to its closed position by means of the rods $U^3$. Then the cams P P' force the plunger F rapidly into the press-chamber and gradually reduce the speed of said movement and correspondingly increase the power of the plunger until the liquid is effectually expressed from the pulp. A further quick propulsion of the plunger forces the back head G from the press-chamber C in opposition to the pressure of the water in the cylinder W, which water is forced back through the valve $g^3$, which is held open by the action of the rib $i$, engaging the arm $h^5$. The back head G is forced back sufficiently far to allow the compressed pulp to drop from the end of the pressure-chamber as soon as the plunger F commences to recede, the plunger being retracted by expansion of the springs R R, and the back head G is forced to the rear end of the press-chamber by means of the rods $N^4$. The water then enters into the cylinder W through the valve $g^3$. As soon as the press-chamber is thus closed the arm $h^5$ drops from the rib $i$ and causes the valve $g^3$ to be closed and retain the water in the cylinder W to resist the opening of the head C during the operation of compressing the succeeding charge of pulp in the press-chamber.

What I claim is—

1. The combination with a rotary shaft, and a companion shaft disposed parallel therewith and supported movably toward and from the same, of correspondingly-shaped cams mounted in reverse positions on said shafts, means for forcing the companion shaft toward the first shaft, and intermeshing gears fastened to said shaft and having their pitch-lines corresponding to the contours of the cams to maintain the cams in constant contact with each other during the rotation of the two shafts as set forth.

2. In combination with the press-chamber and plunger, a main shaft maintained at a uniform distance from the press-chamber, a companion shaft disposed between said main shaft and press-chamber and supported movably toward and from the press-chamber, mechanisms imparting synchronous rotary motion to said shafts, cams mounted in reverse positions on said shafts and forcing the companion shaft toward the press-chamber, means for transmitting said motion to the plunger, and means for forcing the companion shaft toward the main shaft and retracting the plunger.

3. In combination with the press-chamber and plunger, a main shaft maintained at a uniform distance from the press-chamber, a companion shaft disposed between the main shaft and press-chamber and supported movably toward and from the press-chamber, correspondingly-shaped cams mounted in reverse positions on said shafts, gears fastened to the shafts and having their pitch-lines conformed to the peripheries of the cams, means for maintaining said gears intermeshed, means for transmitting rotary motion to said main shaft, and means for transmitting motion from the companion shaft to the plunger.

4. In combination with the press-chamber and plunger, a main shaft maintained at a uniform distance from the press-chamber, a companion shaft disposed between the main shaft and press-chamber and supported movably toward and from the press-chamber, cams mounted in reverse positions on said shafts, a yoke extending from the plunger and provided with journal-boxes receiving through them the companion shaft, means for forcing the companion shaft toward the main shaft, and means for transmitting synchronous rotary motion to said shafts.

5. In combination with the press-chamber and plunger, a main shaft maintained at a uniform distance from the press-chamber, a companion shaft disposed between the main shaft and press-chamber and supported movably toward and from the press-chamber, correspondingly-shaped cams mounted in reverse positions on said shafts, gears fastened to said shafts and having their pitch-lines conformed to the peripheries of the cams, a yoke extending from the plunger and provided with journal-boxes receiving through them the companion shaft, and means for transmitting rotary motion to the said main shaft.

6. In combination with the press-chamber and plunger, a main shaft maintained at a uniform distance from the press-chamber, guides parallel with the line of travel of the plunger, a yoke extending from the plunger and provided with journal-boxes sliding on said guides, a companion shaft mounted in said journal-boxes, cams mounted in reverse positions on said main shaft and companion shaft, springs forcing the sliding journal-boxes toward the main shaft, and means for transmitting rotary motion to said shafts.

7. In combination with the press-chamber, the back head movable to and from one end of said press-chamber, and the plunger in the opposite end of the press-chamber, a main shaft maintained at a uniform distance from said press-chamber, guides parallel with the line of travel of the plunger, a yoke extending from the plunger and provided with journal-boxes sliding on said guides, a companion shaft mounted in the said journal-boxes, cams mounted in reverse positions on said main shaft and companion shaft, springs forcing the sliding journal-boxes toward the main shaft, rods extending from the back head to the sliding journal-boxes and provided with means for drawing the back head onto the press-chamber during the approach of the plunger to its retracted position, and means for transmitting rotary motion to the aforesaid shafts.

8. In combination with the press-chamber and plunger, a rotary main shaft maintained at a uniform distance from the press-chamber, a companion shaft disposed between said main shaft and press-chamber and supported movably to and from the press-chamber, correspondingly-shaped coöperating cams mounted in reverse positions on said shafts and each having its engaging face formed with a concentric portion followed by a prolonged convexed portion, which begins with a greater radius terminating with a gradually-diminishing radius and a sharply-curved convexed portion terminating in a prolongated slightly-convexed portion extending to the first-mentioned concentric portion, said successive portions of the cams imparting to the plunger a variable movement and a period of rest in conformity to the condition of the substance operated on by the press and to the movements of the coöperating parts of the press substantially as set forth.

9. In combination with the supporting-frame, the press-chamber and the plunger, a gate on said press-chamber for opening and closing the feed-port thereof, a rock-shaft mounted transversely on the supporting-frame, rods transmitting motion from said rock-shaft to the gate, a rotary wheel actuating the said rock-shaft, and means for actuating the plunger.

10. In combination with the supporting-frame, the press-chamber and the plunger, a gate on said press-chamber for opening and closing the feed-port thereof, a rock-shaft mounted transversely on the supporting-frame, a lug projecting from the rock-shaft, a rotary wheel provided with laterally-projecting pins disposed to swing the said lug alternately in opposite directions, rods transmitting motion from the rock-shaft to the gate, and means for actuating the plunger.

11. In combination with the supporting-frame, the press-chamber and the plunger, a gate on said press-chamber for opening and closing the feed-port thereof, a rock-shaft mounted transversely on the supporting-frame, a lug projecting from the rock-shaft, a lever pivoted to the rock-shaft, a spring interposed between the free end of the lever and lug, a rotary wheel provided with laterally-projecting pins disposed to alternately actuate said lever and lug, rods transmitting motion from the rock-shaft to the gate, and means for actuating the plunger as set forth.

12. In combination with the supporting-frame, the press-chamber, and the plunger, a gate for opening and closing the feed-port of the press-chamber, a rock-shaft mounted on the supporting-frame, rods transmitting motion from the rock-shaft to the gate, means for adjusting the lengths of said rods, means for actuating the rock-shaft, and means for actuating the plunger.

13. In combination with the press-chamber and press-plunger, a transverse main shaft maintained at a uniform distance from the press-chamber, a companion shaft parallel with the main shaft and movable toward and from the press-chamber, cams mounted in reverse positions on said shafts and intermittently forcing the companion shaft toward the press-chamber, means for imparting synchronous rotary motion to said shafts, means for pushing the plunger into the press-chamber by the movement of the companion shaft, and means for pushing the companion shaft toward the main shaft and simultaneously retracting the plunger.

14. In combination with the supporting-frame, press-chamber and plunger, a gate for opening and closing the feed-port of said press-chamber, a rock-shaft mounted on the supporting-frame, means for transmitting motion from the rock-shaft to the gate, a rotary wheel, means connected to said wheel for operating the rock-shaft and adjustable to and from operative position, and means for transmitting motion to said wheel.

15. In combination with the supporting-frame, press-chamber and plunger, a gate for opening and closing the feed-port of the press-chamber, a rock-shaft mounted transversely on the supporting-frame, rods transmitting motion from the rock-shaft to the gate, a lug projecting from the rock-shaft, a rotary wheel, pins connected to said wheel adjustably to and from position to actuate the aforesaid lug, and means for transmitting motion to said wheel as set forth.

16. In combination with the press-chamber, plunger and movable back head, a cylinder, a piston in said cylinder bearing on the aforesaid back head, a water-induction pipe communicating with said cylinder, a water-eduction pipe communicating with the induction-pipe, a valve interposed between said pipes to control the flow of water to and from the cylinder, and means for automatically operating the valve to periodically apply and remove resistance of the water to and from the back head.

17. In combination with the supporting-frame, press-chamber, plunger and movable back head, a cylinder, a piston in said cylinder bearing on said back head, a water-induction pipe communicating with said cylinder, a water-eduction pipe communicating with the induction-pipe, a valve interposed between said pipes to control the flow of water to and from the cylinder, a rock-arm mounted on the supporting-frame, a rod transmitting motion from said rock-shaft to the valve, a rotary wheel, a segmental rib on said wheel and concentric therewith and disposed to engage and release the aforesaid rock-arm, and means for transmitting motion to said wheel as set forth.

18. In combination with the supporting-frame, press-chamber, plunger and movable back head, a cylinder, a piston in said cylinder bearing on the said back head, a water-induction pipe communicating with said cylinder, a water-eduction pipe communicating with said induction-pipe, an automatically-closing valve interposed between said pipes to control the flow of water to and from the cylinder, a shaft provided with means for opening the valve, an arm attached to said shaft, a lever depending from the shaft, a rock-arm mounted on the supporting-frame, a rod connected at one end to said rock-shaft and at the opposite end provided with means for connecting it at different points in its length to the arm of the valve-operating shaft, a rotary wheel, a segmental rib on said wheel disposed to engage and release the aforesaid rock-arm, and means for transmitting motion to said wheel as set forth.

19. A press comprising a press-chamber, a gate for opening and closing the feed-port of said press-chamber, a plunger in one end of the press-chamber, a movable back head intermittently opening and closing the opposite end of the press-chamber, a main cam-shaft maintained at a uniform distance from the press-chamber, parallel bars at opposite sides of the press-chamber, a yoke on the plunger provided with journal-boxes sliding longitudinally on said bars, a companion cam-shaft mounted in said journal-boxes, cams mounted on the aforesaid shafts and disposed reverse from each other, intermeshing gears fastened to said shafts and having their pitch-lines corresponding to the peripheries of the cams, springs forcing the companion shaft toward the main shaft, a rock-shaft actuating the gate, a cylinder, a piston in said cylinder bearing on the movable back head, a water-induction pipe communicating with said cylinder, a water-eduction pipe communicating with the induction-pipe, a valve interposed between said pipes, a rock-arm mounted on the supporting-frame and actuating the valve, a wheel attached to the main cam-shaft, means connected to said wheel for operating the rock-shaft, a segmental rib on said wheel engaging and releasing the rock-arm, and means for transmitting motion to said wheel as set forth.

RUFUS ELDRED BOSCHERT.

Witnesses:
J. J. LAASS,
R. M. WHEELER.